US012631834B2

(12) United States Patent
Chen et al.

(10) Patent No.: US 12,631,834 B2
(45) Date of Patent: May 19, 2026

(54) OPTICAL TRANSMISSION DEVICE AND COUPLING METHOD THEREOF

(71) Applicant: QuantumZ Inc., Kaohsiung City (TW)

(72) Inventors: Chun-Chieh Chen, Kaohsiung City (TW); Po-Ting Chen, Kaohsiung City (TW); Chao-Hui Kuo, Kaohsiung City (TW); Chia-Jung Chang, Kaohsiung City (TW)

(73) Assignee: QuantumZ Inc., Kaohsiung City (TW)

( * ) Notice: Subject to any disclaimer, the term of this patent is extended or adjusted under 35 U.S.C. 154(b) by 582 days.

(21) Appl. No.: 17/972,341

(22) Filed: Oct. 24, 2022

(65) Prior Publication Data

US 2023/0127483 A1 Apr. 27, 2023

(30) Foreign Application Priority Data

Oct. 26, 2021 (TW) ................................. 110139678

(51) Int. Cl.
G02B 6/42 (2006.01)

(52) U.S. Cl.
CPC ......... G02B 6/4212 (2013.01); G02B 6/4214 (2013.01); G02B 6/4224 (2013.01); G02B 6/423 (2013.01); G02B 6/4249 (2013.01); G02B 6/4284 (2013.01)

(58) Field of Classification Search
CPC ........ G02B 6/12; G02B 6/12004; G02B 6/26; G02B 6/262; G02B 6/264; G02B 6/30; G02B 6/32; G02B 6/3628; G02B 6/3652; G02B 6/3656; G02B 6/4201; G02B 6/4204; G02B 6/4212; G02B 6/4214; G02B 6/4249

See application file for complete search history.

(56) References Cited

U.S. PATENT DOCUMENTS

| | | | | |
|---|---|---|---|---|
| 6,618,514 | B1 * | 9/2003 | Cole | G02B 6/30 |
| | | | | 385/52 |
| 6,866,426 | B1 * | 3/2005 | Steinberg | G02B 6/423 |
| | | | | 385/83 |
| 6,874,952 | B2 * | 4/2005 | Nishimura | G02B 6/421 |
| | | | | 385/52 |
| 11,402,594 | B2 * | 8/2022 | Kato | G02B 6/30 |
| 2002/0196998 | A1 * | 12/2002 | Steinberg | G02B 6/322 |
| | | | | 385/39 |

(Continued)

*Primary Examiner* — Uyen Chau N Le

(74) *Attorney, Agent, or Firm* — MUNCY, GEISSLER, OLDS & LOWE, P.C.

(57) ABSTRACT

An optical transmission device is provided. A substrate includes an optical transmission channel exposed on its end surface, and a first positioning portion. A jumper includes a mounting portion abutting the end surface and a second positioning portion engaged to the first positioning portion. An optical fiber is mounted to the mounting portion, and the end surface of the optical fiber aligns with the optical transmission channel. The coupling method of the optical transmission device includes steps: forming at least one first hole on the substrate, forming an optical transmission layer with at least one optical transmission channel on the substrate, forming an alignment mark on the optical transmission layer within the first hole, forming at least one second hole on the substrate based on the alignment mark, and connecting the jumper to the second hole and make the jumper abutting against the substrate.

10 Claims, 17 Drawing Sheets

(56)         References Cited

U.S. PATENT DOCUMENTS

| | | | |
|---|---|---|---|
| 2003/0210601 A1* | 11/2003 | Lin | G11C 16/30 |
| | | | 365/229 |
| 2011/0085763 A1* | 4/2011 | Baugh | G02B 6/4292 |
| | | | 385/59 |
| 2011/0142395 A1* | 6/2011 | Fortusini | G02B 6/34 |
| | | | 385/37 |
| 2013/0236144 A1* | 9/2013 | Tong | G02B 6/4284 |
| | | | 385/102 |
| 2018/0149820 A1* | 5/2018 | Chen | G02B 6/43 |
| 2021/0157056 A1* | 5/2021 | Butler | G02B 6/30 |
| 2021/0302679 A1* | 9/2021 | Kato | G02B 6/262 |
| 2022/0283388 A1* | 9/2022 | Nagasaki | G02B 6/4284 |
| 2022/0373742 A1* | 11/2022 | Kim | G02B 6/30 |

* cited by examiner

OPTICAL TRANSMISSION DEVICE AND COUPLING METHOD THEREOF

BACKGROUND OF THE INVENTION

Field of the Invention

The present invention relates to an optical transmission device and a coupling method thereof

Description of the Prior Art

The rapid development of networking is driving demands of ever-larger bandwidth in recent years. Conventionally, signal transmission is carried out using electrical current where the signal is transmitted in a coaxial cable by changing properties of DC and AC. Since the development of the networking has made the transmission speed and bandwidth insufficient, optical transmission of signals is a viable option over conventional electrical transmission.

In optical communication, an optical waveguide is generally less than 1 μm and its corresponding core of a single-mode optical fiber is about 10 μm, hence there is a big difference in dimensions between. Furthermore, it allows very little tolerance in coupling alignment during packaging. Therefore, there is considerable loss between the optical fiber and the optical waveguide.

The conventional active optical fiber coupling has problems such as poor coupling efficiency and low assembling tolerance, and is not suitable for high-speed transmission (higher than 10 G). Compared to the conventional active optical fiber coupling, passive lens optical fiber coupling has advantages such as higher coupling efficiency and higher assembling tolerance, and is suitable for high-speed transmission (10 G~400 G). However, the cost of lens development is higher, the coupling steps are more complicated, and more coupling time is required. The present invention is proposed to obviate or at least mitigate the above-mentioned disadvantages.

SUMMARY OF THE INVENTION

The object of the present invention is to provide an optical transmission device and a coupling method thereof, that are beneficial for aligning an optical fiber and an optical transmission channel easily, quickly and precisely.

To achieve the objects, an optical transmission device is provided, including a substrate, a jumper and an optical fiber. The substrate has an end surface, a first positioning portion and an optical transmission channel exposed on the end surface. The jumper has a mounting portion and a second positioning portion. The mounting portion abuts the end surface of the substrate, and the second positioning portion and the first positioning portion limit each other. The optical fiber is mounted to the mounting portion, and an end surface of the optical fiber aligns with the optical transmission channel.

A coupling method of the optical transmission device is also provided. Following steps are included: forming at least one first hole on a substrate, forming an optical transmission layer with at least one optical transmission channel on the substrate, forming an alignment mark on the optical transmission layer within the at least one first hole, forming at least one second hole on the substrate based on the alignment mark, and connecting a jumper to the at least second hole and make the jumper abutting against the substrate.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 8 is a partial enlargement of FIG. 7;

DETAILED DESCRIPTION OF THE PREFERRED EMBODIMENTS

Figure 1:
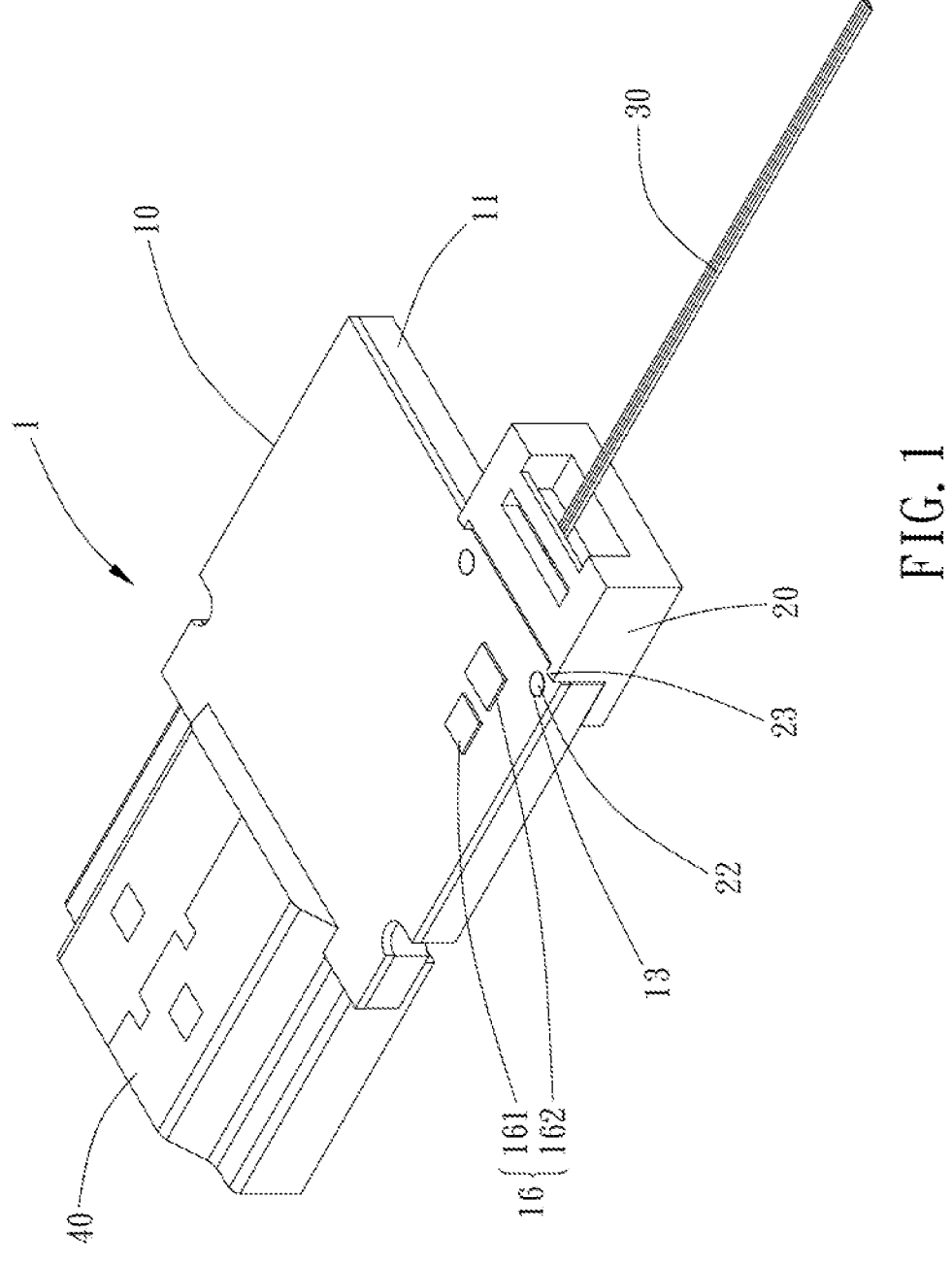
FIG. 1 is a stereogram of a first embodiment according to the present invention.
Figure 2:
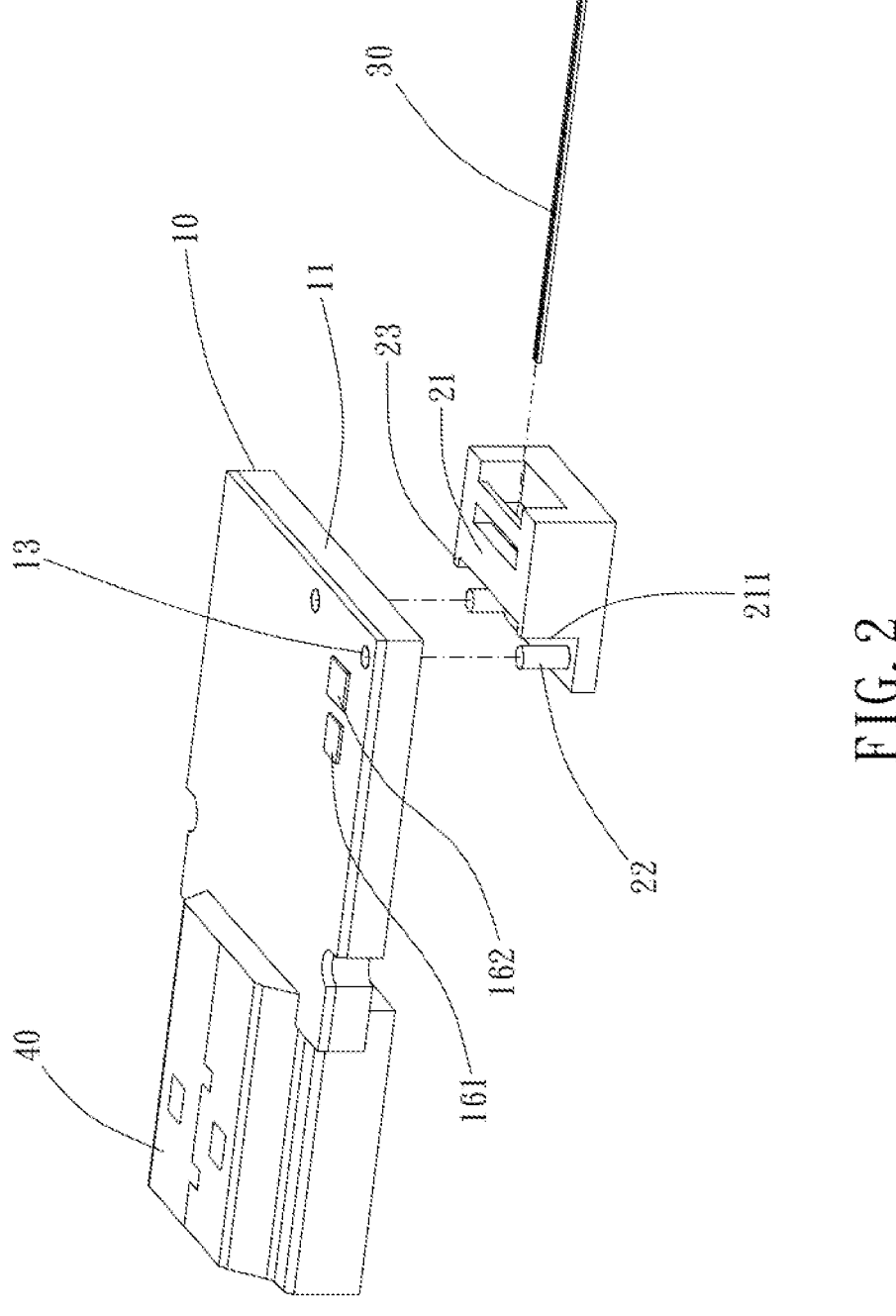
FIG. 2 is a breakdown drawing of the first embodiment according to the present invention.
Figures 3, 4:
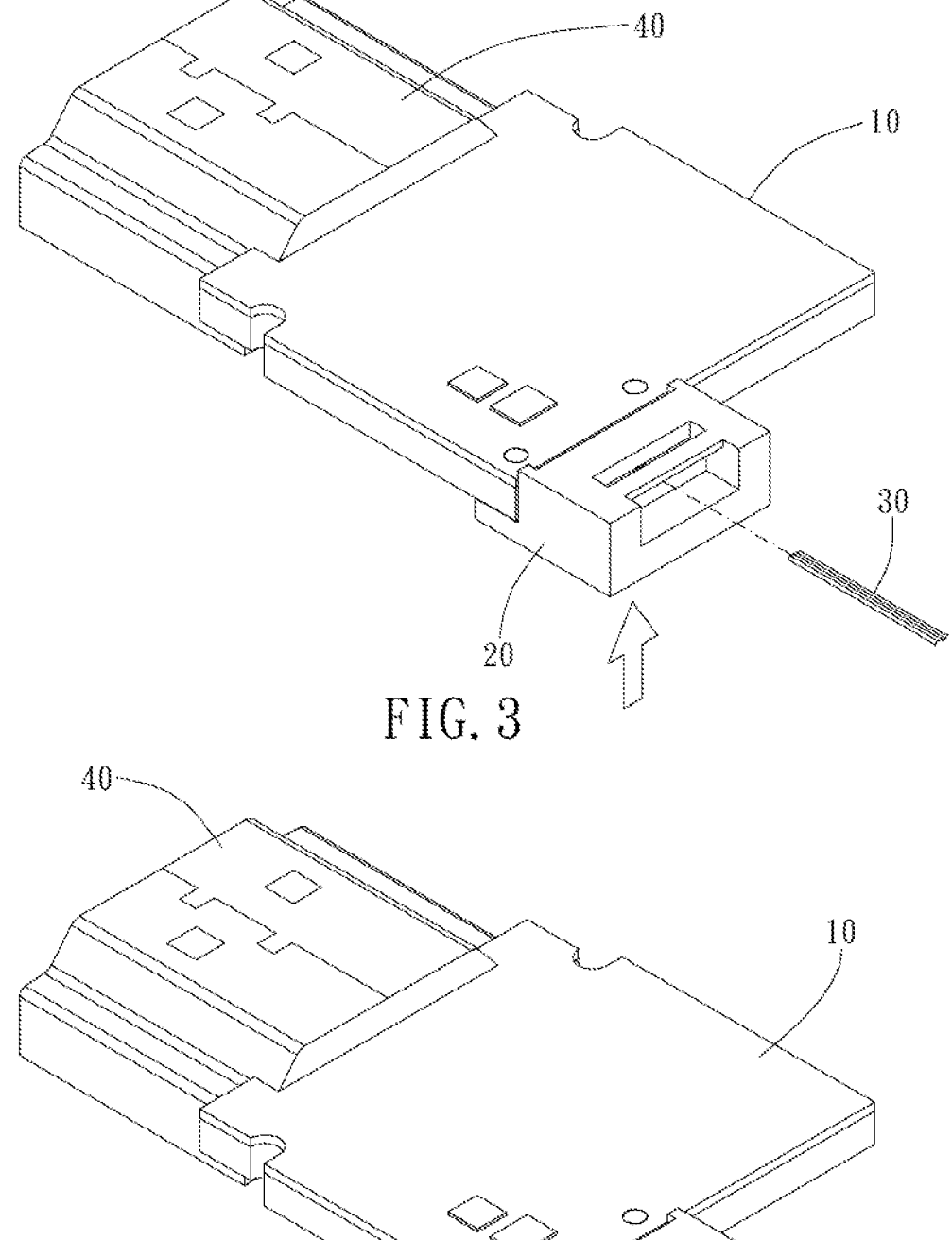
FIGS. 3 and 4 are drawings showing assembling of the first embodiment according to the present invention.
Figure 5:
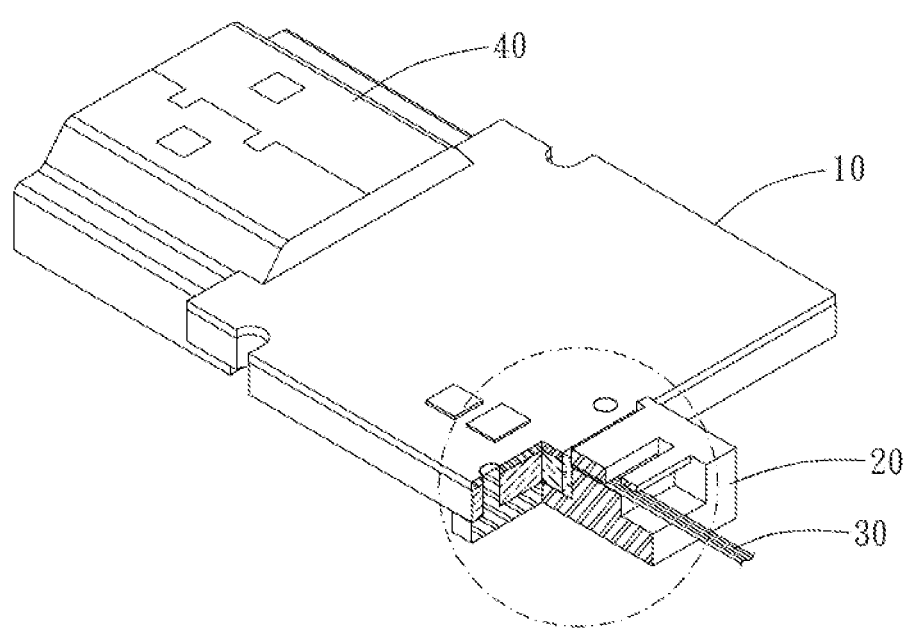
FIG. 5 is a partial cross-sectional view of the first embodiment according to the present invention.
Figure 6:
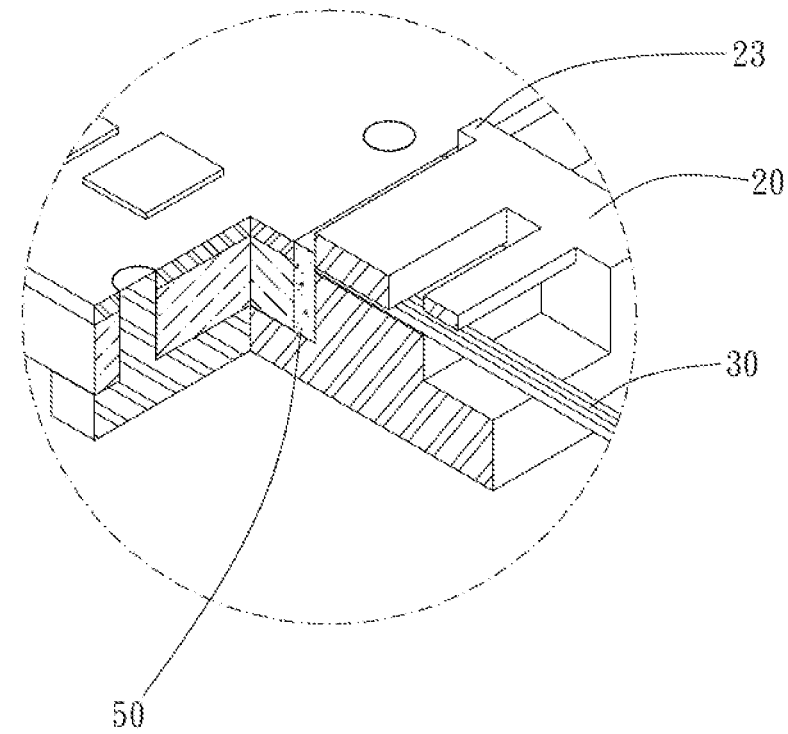
FIG. 6 is a partial enlargement of FIG. 5.
Figure 7:
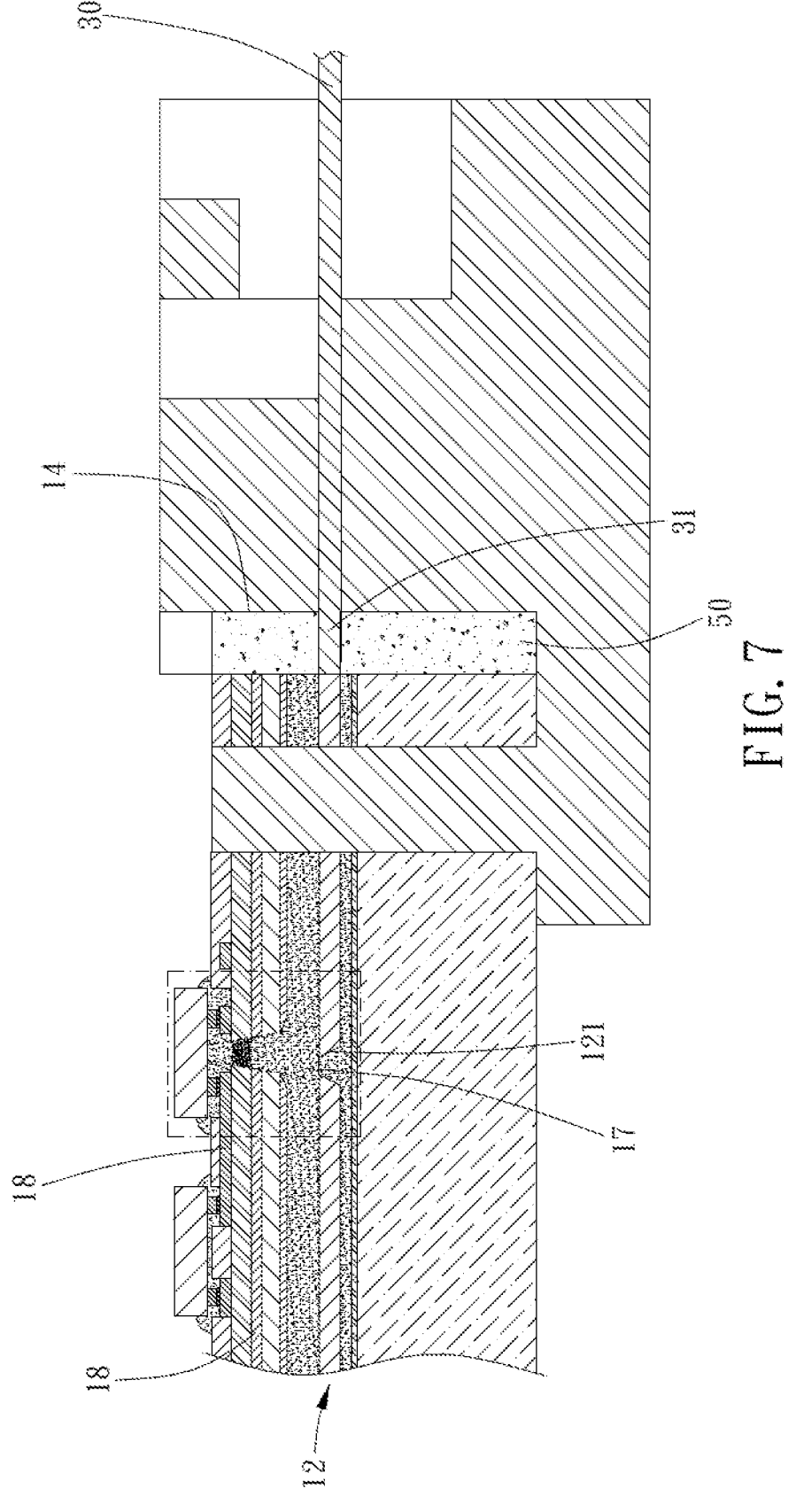
FIG. 7 is a cross-sectional view of the first embodiment according to the present invention.
Figure 9:
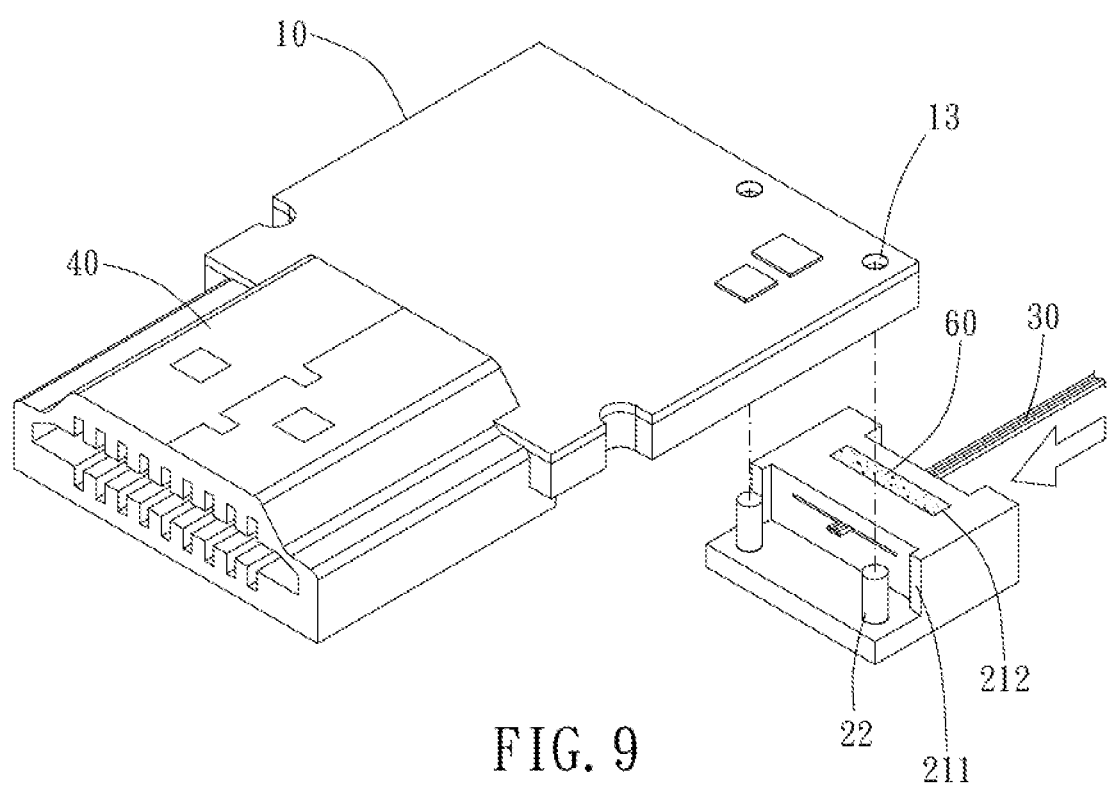
FIGS. 9 and 10 are drawings showing assembling of a second embodiment according to the present invention.
Figure 10:
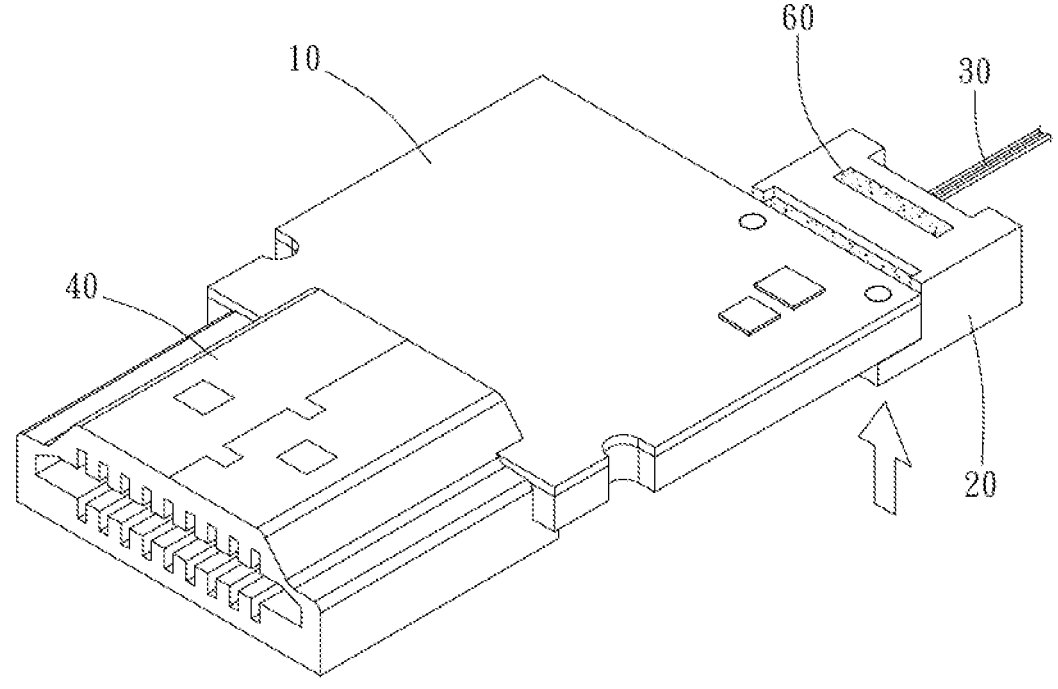
Figure 11:
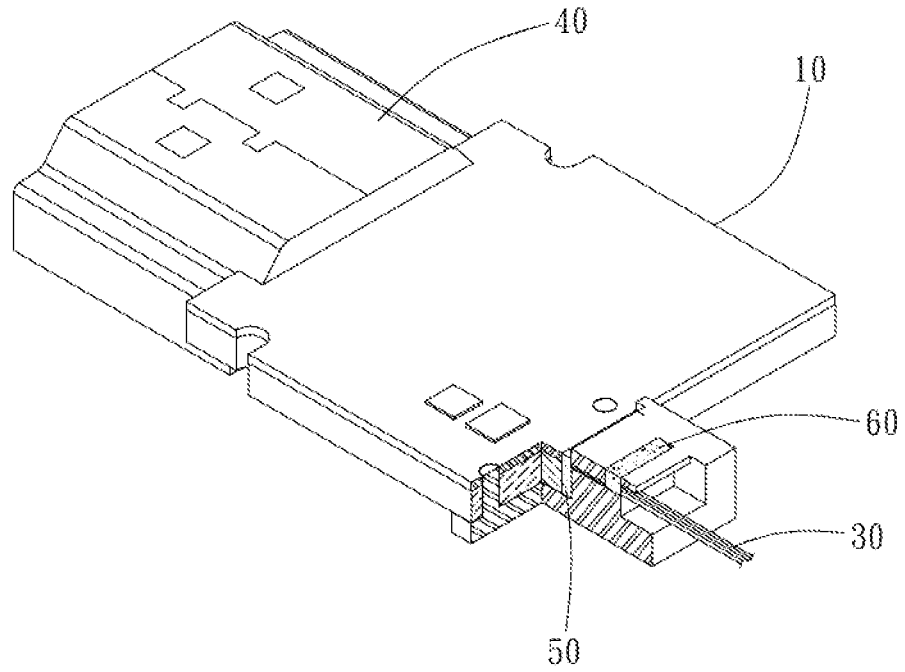
FIG. 11 is a stereogram with a partial cross-section of the second embodiment according to the present invention.
Figure 12:
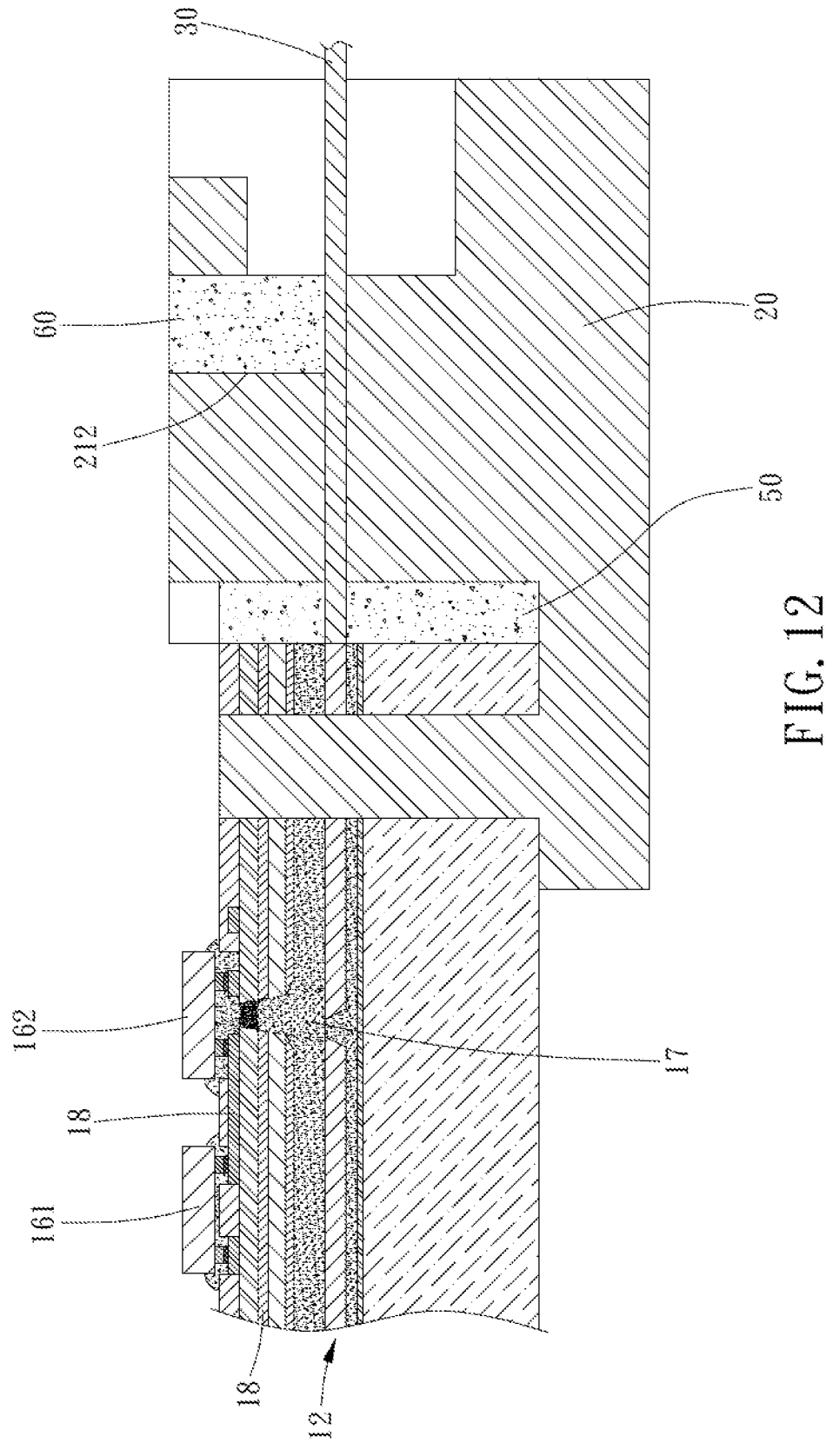
FIG. 12 is a cross-sectional view of the second embodiment according to the present invention.

Refer to FIGS. 1 to 8 for an embodiment according to the present invention. An optical transmission device 1 of the present invention includes a substrate 10, a jumper 20 and an optical fiber 30.

The substrate 10 includes an end surface 11, an optical transmission channel 12 and a first positioning portion 13, and the optical transmission channel 12 is formed in an optical transmission layer and exposed on the end surface 11. The jumper 20 includes a mounting portion 21 and at least one second positioning portion 22. The mounting portion 21 abuts the end surface 11 of the substrate 10, and the second positioning portion 22 and the first positioning portion 13 are positioned to limit each other. The optical fiber 30 is arranged in the mounting portion 21, and the end surface of the optical fiber 30 corresponds to the optical transmission channel 12 (for example, the end surface of the optical fiber 30 aligns with the optical transmission channel 12) so that the light may be transmitted between the optical transmission channel 12 and the optical fiber 30. The end surface 11 may be any sides of the substrate 10, or any region in an inner surface of a recess of the substrate 10. In this embodiment, the first positioning portion 13 is a positioning hole, and the second positioning portion 22 is a column configured to be inserted in the positioning hole. However, the first positioning portion 13 may also be a column, and the second positioning portion 22 may also be a positioning hole. It should be noted that each of the column and the positioning hole may be of any suitable shapes to achieve the same positioning effect. In other embodiments, the first positioning portion and the second positioning portion may be members that are magnetically coupled to each other or may be male and female members that are connectable to each other.

The substrate 10 further includes a connector 40 such as HDMI, USB or USB-C connector, which greatly reduces the size and components of the package. The optical fiber 30 and the optical transmission channel 12 can be easily coupled to each other by connecting the first positioning portion 13 and the second positioning portion 22. The required transmission efficiency can be achieved without the need for optical coupling with lenses, which can reduce packaging, coupling, alignment procedures and time. The substrate 10 and the jumper 20 can be assembled precisely for high coupling efficiency.

In this embodiment, an end surface of the optical transmission channel 12 is located between the first positioning portion 13 and the end surface of the optical fiber 30. The jumper 20 further includes at least one protrusion 23 abutting against the end surface 11 of the substrate 10. The distance between the at least one protrusion 23 and the second positioning portion 22 is equal to the distance between and the end surface 11 of the substrate 10 and the first positioning portion 13, and the end surface of the optical fiber 30 is substantially aligned with and the end surface of the protrusion 23. The mounting portion 21 includes an abutting surface 211 abuts against the end surface 11 of the substrate 10, and the distance between the first positioning portion 13 and the end surface 11 of the substrate 10 is equal to the distance between the second positioning portion 22 and the abutting surface 211. Hence the substrate 10 and the jumper 20 can be connected and positioned with high precisions, and the optical fiber 30 and the optical transmission channel 12 can correspond to each other precisely to increase the coupling efficiency.

Figure 13:
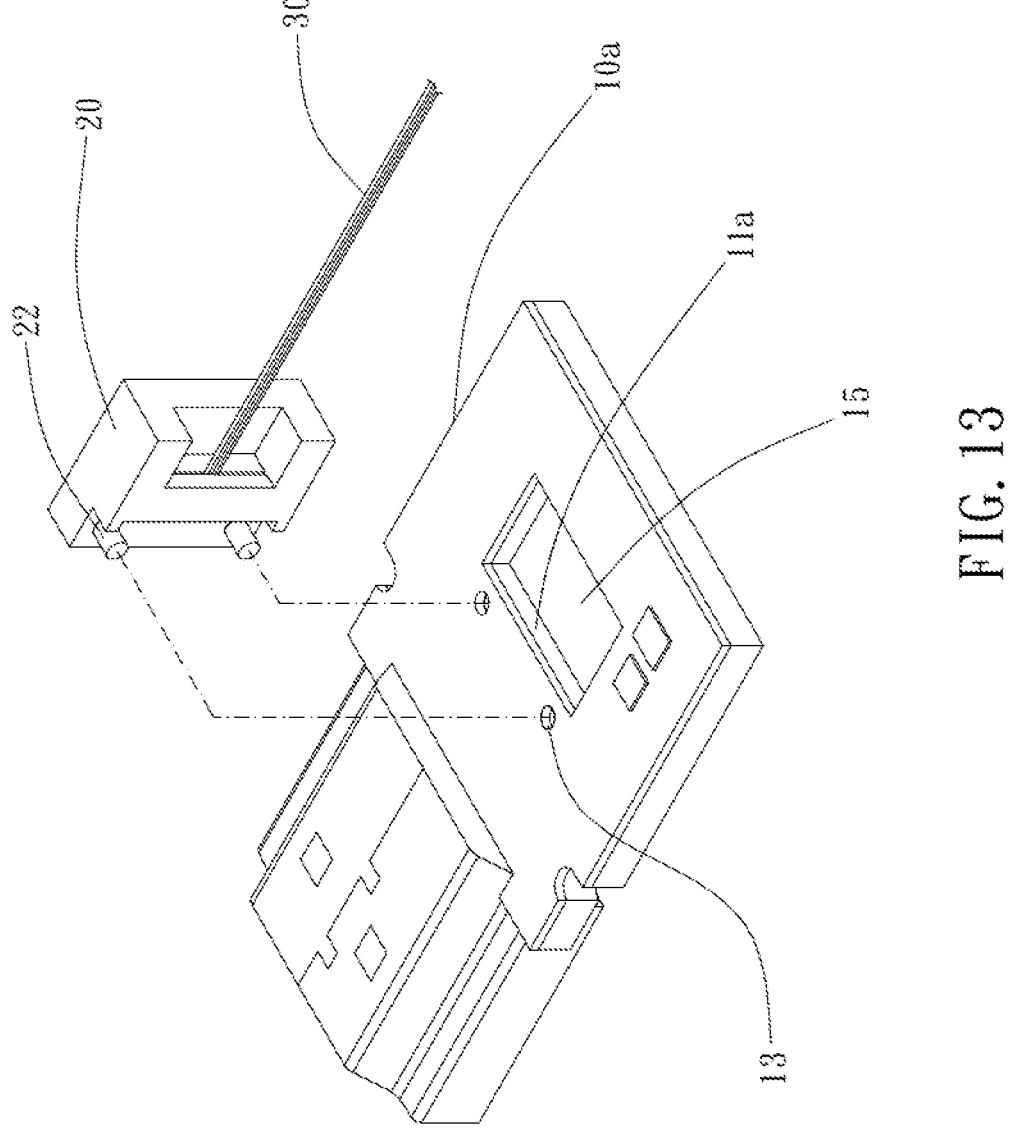
FIGS. 13 and 14 are drawings showing assembling of a third embodiment according to the present invention.
Figure 14:
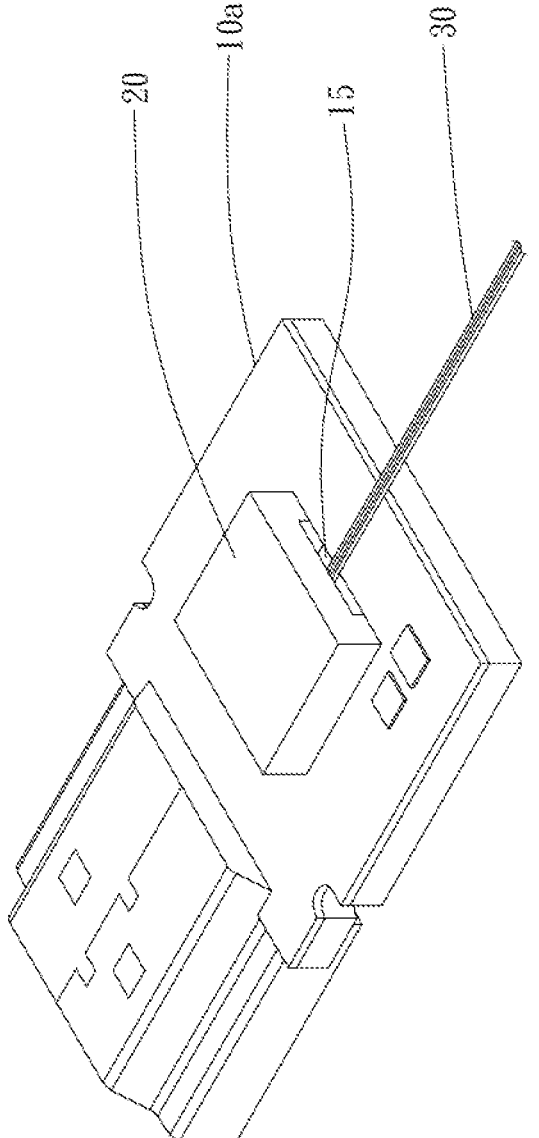

The end surface 11 of the substrate 10 and the mounting portion 21 form a gap 14 therebetween, the optical fiber 30 includes an end portion 31 extending into the gap 14, and an optical material 50 (such as refractive index resin or other material with suitable refractive index) is disposed in the gap 14 to bind the end portion 31 of the optical fiber 30. The optical material 50 can improve the transmission efficiency by adjusting the refractive index for the light transmitted between the optical material 50 and optical fiber 30. In the second embodiment shown in FIGS. 9 to 12, the optical fiber 30 may be secured to the mounting portion 21 first, and the jumper 20 is then inserted to the substrate 10. For example, the mounting portion 21 includes a slot 212 on a side and the optical fiber 30 is disposed therethrough. A binder 60 (such as UV resin or other suitable adhesive) is disposed in the slot 212 to bind the optical fiber 30, the optical material 50 is then disposed in the gap 14 and binds the end portion 31 of the optical fiber 30, so that the optical fiber 30 and the optical transmission channel 12 can be positioned to align with each other easily, quickly and precisely. In the third embodiment shown in FIGS. 13 and 14, the substrate 10a further includes a recess 15 with the end surface 11a, the first positioning portion 13 is located besides the recess 15, and the jumper 20 is engaged in the recess 15.

Refer to FIGS. 1 to 8 again, the substrate 10 further includes a photoelectric conversion module 16 that consists of an integrated circuit package 161 and an optical component 162 connected thereto. The optical component 162 corresponds to a reflective surface 121 of the optical transmission channel 12, and the optical component 162 includes a photoelectric conversion element (optical receiver) or a photoelectric emitting element (optical transmitter). The substrate 10 further includes a refractor 17 (the portion shown by dotted lines in FIG. 8) connected between the optical component 162 and the reflective surface 121. The refractive index of the refractor 17 progressively increases (at the transmitting (Tx) end) or progressively decreases (at the receiving (Rx) end) from the optical component 162 towards the reflective surface 12. The substrate 10 further includes at least one circuit layer 18 which may be (but not limited to) provided in a flexible printed circuit (FPC) to connect the connector 40, the photoelectric conversion module 16, the integrated circuit package 161 and the optical component 162.

Figure 8:
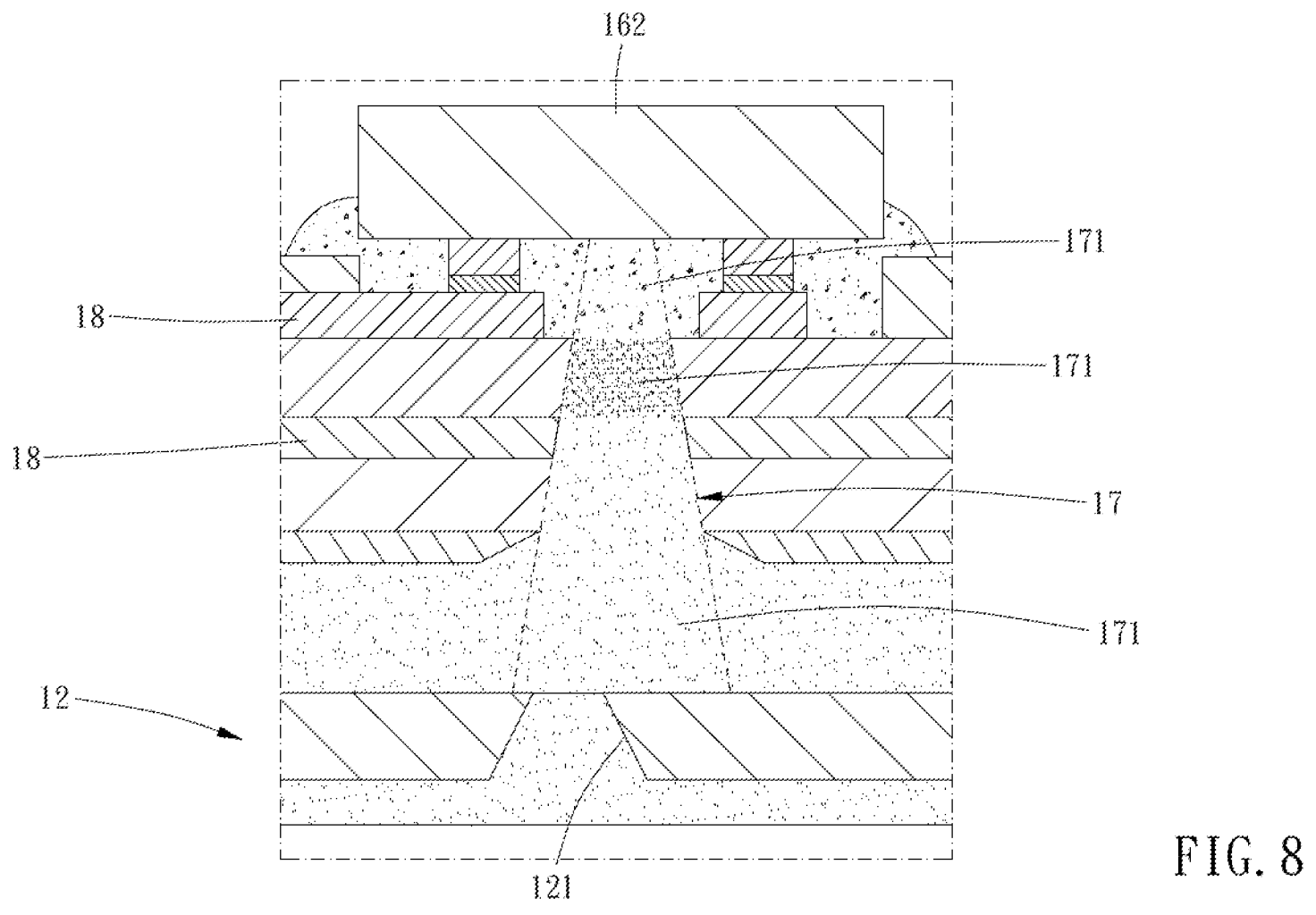

As shown in FIG. 8, the refractor 17 includes a plurality of refractive layers 171 of different refractive indexes. One of the refractive layers 171 connected to the optical transmission channel 12 may be constructed by a part of a cladding of the optical transmission channel 12, or may be constructed by a part of an adhesive layer (bonding sheet) or polyimide (PI) layer between a core layer of the optical transmission channel 12 and the flexible printed circuit.

Figure 15:
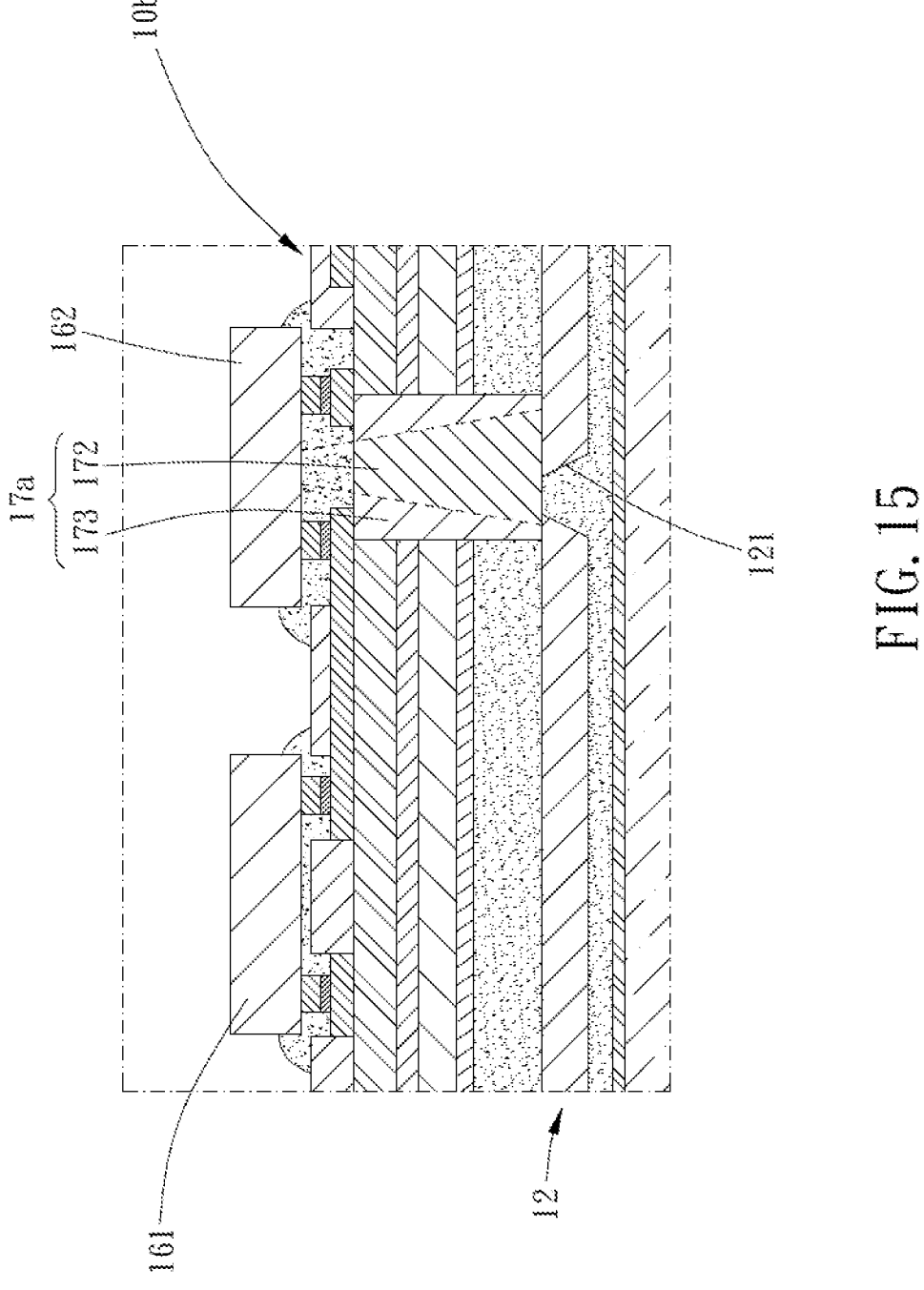
FIG. 15 is a cross-sectional view of a fourth embodiment according to the present invention.

In the fourth embodiment shown in FIG. 15, the substrate 10b includes a light-guiding portion 17a located between the optical component 162 and the reflective surface 121. The light-guiding portion 17a has a core 172 extends from the optical component 162 toward the reflective surface 121, with a cladding 173 coated over the core 172. The light-guiding portion 17a has a structure similar to that of the optical fiber, and optical signals can be effectively transmitted therein. In this embodiment, the core 172 is a cone, and the diameters of the opposite ends of the cone are 60 μm and 100 μm respectively. However, the shape of the core 172 and the diameters of the opposite ends may vary depending on different optical properties and requirements.

Refer to FIGS. 1 to 8 again, the electrical signal from the connector 40 can be transmitted to the integrated circuit package 161 via the at least one circuit layer 18. The integrated circuit package 161 then controls the photoelectric emitting element to generate optical signals based on the electrical signals. The optical signals pass through the refractor 17 and are reflected by the reflective surface 121 to enter the optical transmission channel 12, and the optical signals are then transmitted out via the optical fiber 30. Alternatively, the optical signals from the optical fiber 30 may enter the optical transmission channel 12 and are reflected by the reflective surface 121 to pass through the refractor 17 and then received by the photoelectric conversion element. The photoelectric conversion element converts the optical signals into electrical signals that can be passed through a transimpedance amplifier (TIA) and then transmitted to the connector 40 via the at least one circuit layer 18 before inputting the electrical signals into an electronic device.

Figure 16:
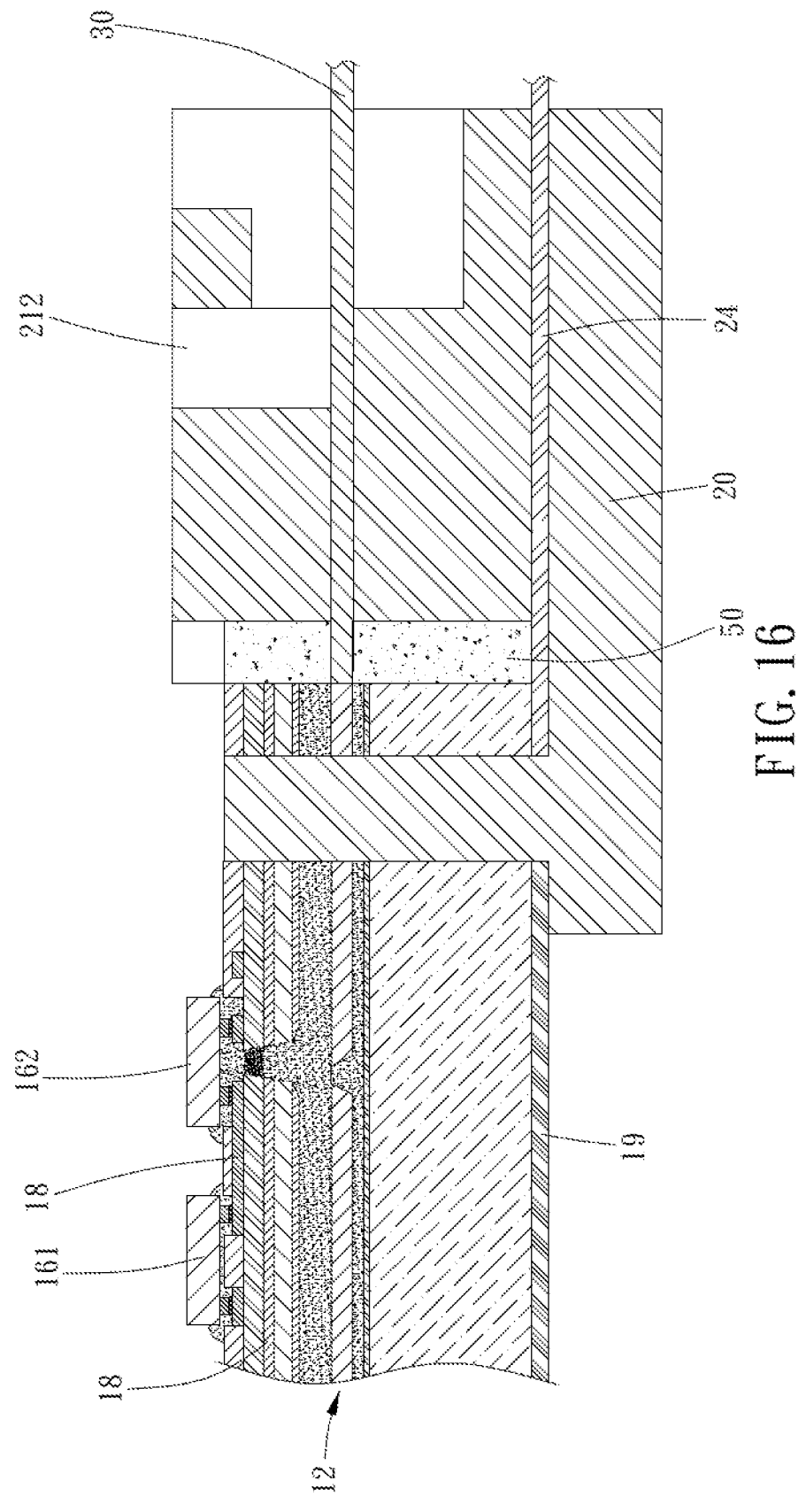
FIG. 16 is a cross-sectional view of a fifth embodiment according to the present invention.
Figures 17, 18:
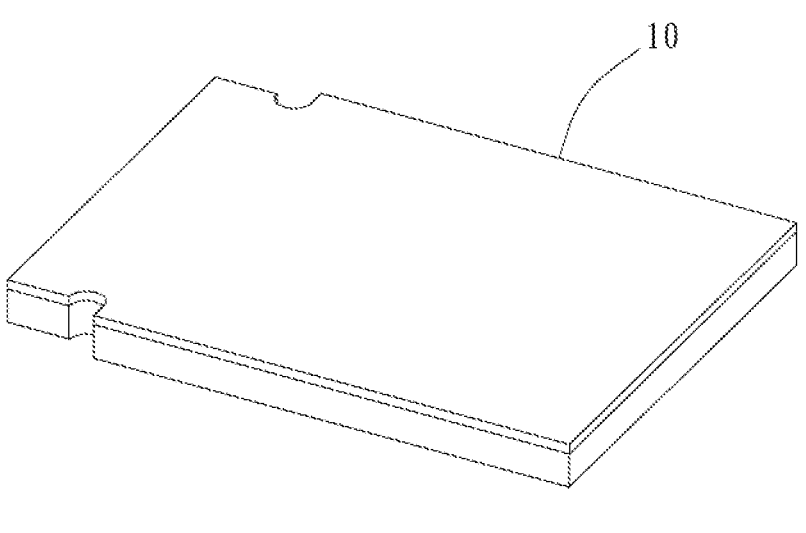
FIGS. 17 to 23 are drawings showing forming of a first positioning portion on a substrate according to an embodiment of the present invention.
Figure 19:
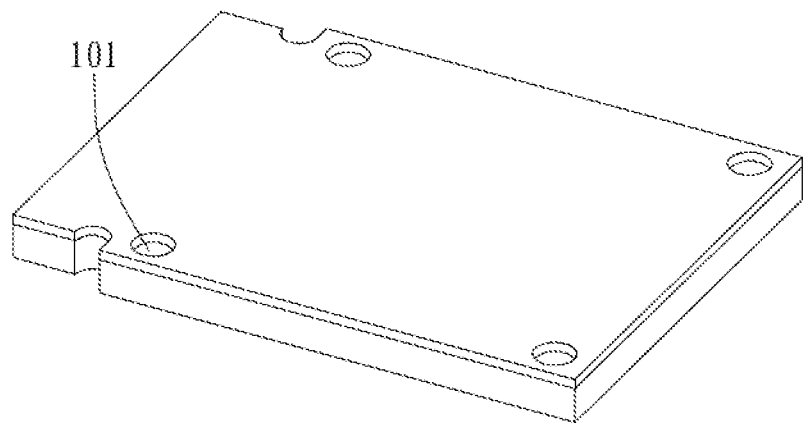
Figure 20:
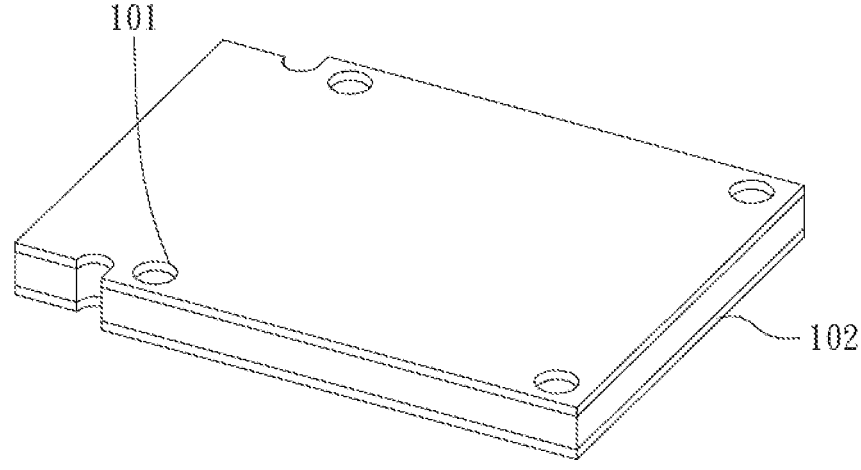
Figure 21:
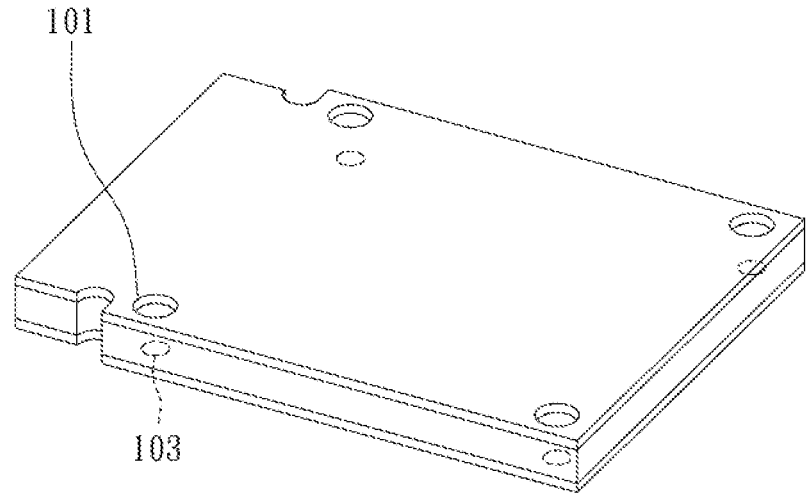
Figure 22:
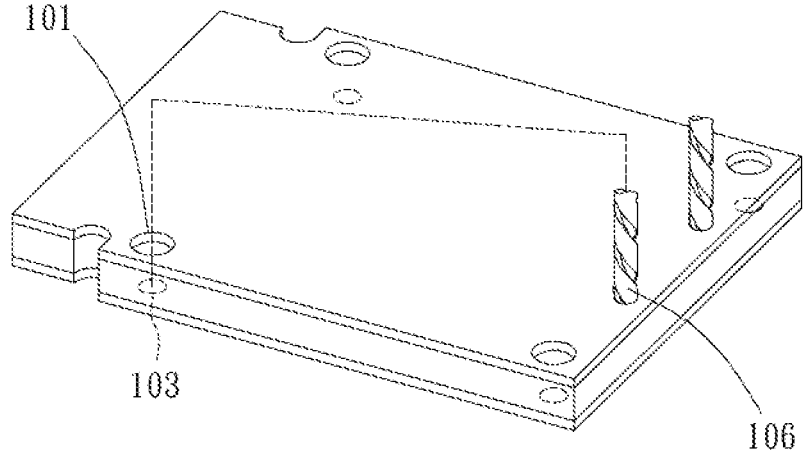
Figure 23:
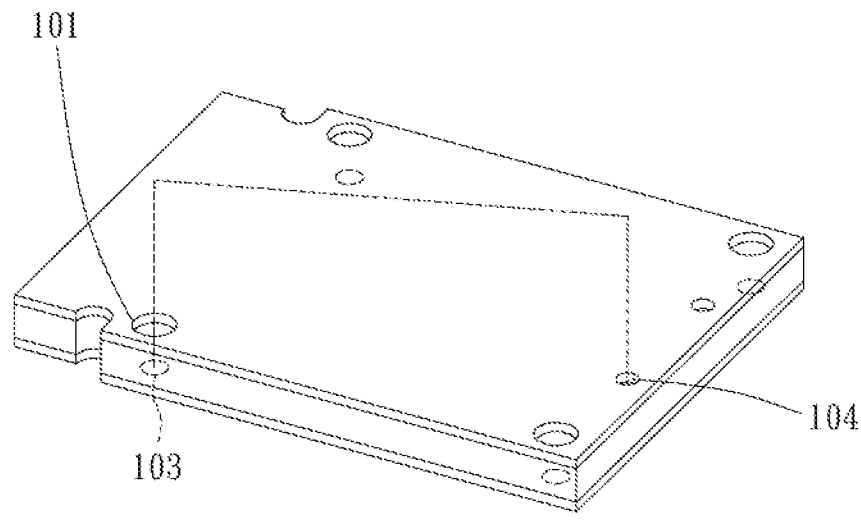

In the fifth embodiment shown in FIG. 16, the substrate 10 may further include a circuit layer 19 disposed on a side opposite to the optical transmission channel 12. The jumper 20 further includes a transmission circuit 24 (such as wire, coaxial cable, or other conductive member) electrically connected to the circuit layer 19. The circuit layer 19 and the connector 40 are electrically connected for transmitting electrical signals from the connector 40 (connected to an external electronic device) to the transmission circuit 24 of the jumper 20, or for transmitting electrical signals from the transmission circuit 24 of the jumper 20 to the connector 40 to the connected electronic device. The transmission circuit may be, for example, a USB-C cable which allows both transmitting and charging.

According to the above described structure, the connector 40 may include one or more sets of electrical pins configured to be connected to at least one of the circuit layer 18 and the circuit layer 19, that provides photoelectric conversion of signal transmission mode.

Refer to FIGS. 1-8 and 17-23, the present invention also provides a coupling method of an optical transmission device including following steps: forming at least one first hole 101 on a substrate 10, forming an optical transmission layer 102 with at least one optical transmission channel 12, forming an alignment mark 103 on the optical transmission layer within the first hole 101, forming at least one second hole 104 on the substrate 10 based on the alignment mark 103; and connecting a jumper 20 to the at least one second hole 104 and make the jumper 20 abutted against the substrate 10. The first hole 101 and the second hole 104 may be formed by a punch pin 105 or drill 106. Preferably, the first hole 101 and the alignment mark 103 have a common center, the offset of forming the second hole 104 is less than or equal to ±5 μm, so that the alignment precision of the optical fiber 30 and the optical transmission channel 12 is ensured.

The alignment mark 103 may be a notation, hole (the periphery of the first hole 101 or another hole) or any pattern(s). The optical transmission layer 102 may be (but not limited to photoresist) or other non-conductive material. Preferably, the optical transmission layer 102 is light-penetrable so that the position of the alignment mark 103 in the optical transmission layer 102 can be obtained. The precise position of the end surface of the optical transmission channel 12 in the optical transmission layer 102 relative to the alignment mark 103 (the reference center for processing the second hole 104) can be ascertain, so the precision of forming the second hole 104 is extremely high. Hence the optical fiber 30 and the optical transmission channel 12 are precisely aligned with each other after the jumper 20 and the substrate 10 are connected, thus ensuring a higher coupling efficiency.

In the first embodiment as shown in FIGS. 1-8, further steps may be optionally applied after the jumper 20 is engaged to the second hole 104: disposing an optical fiber 30 in the jumper 20 to have the optical fiber 30 corresponding to the optical transmission channel 12, and disposing an optical material 50 between the substrate 10 and the jumper 20 to bind the optical fiber 30.

In the second embodiment as shown in FIGS. 9-12, further steps may be optionally followed: binding an optical fiber 30 to the jumper 20 by a binder 60 before engaging the jumper 20 to the second hole 104, and binding the optical fiber 30 by an optical material 50 applied between the substrate 10 and the jumper 20 after the jumper 20 is engaged to the second hole 104 (the first positioning portion 13 of the substrate 10) and the optical fiber 30 corresponds to the optical transmission channel 12.

The optical material 50 applied between the substrate 10 and the jumper 20 can correct the refractive index and thus improve the light transmission therebetween, and stabilize and position the optical fiber 30. The binder 60 can further stabilize the optical fiber 30. Therefore, it is beneficial for aligning the optical fiber 30 and the optical transmission channel 12 easily, quickly and precisely.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An optical transmission device, including:
   a substrate, having an end surface, a first positioning portion, and an optical transmission channel being exposed on the end surface;
   a jumper, having a mounting portion and a second positioning portion, and the mounting portion abuts the end surface of the substrate, and the second positioning portion and the first positioning portion limit each other; and
   an optical fiber, connecting to the mounting portion, and an end surface of the optical fiber corresponds to the optical transmission channel;
   wherein the first positioning portion is a positioning hole extending in a direction transverse to an axial direction of the optical fiber, and the second positioning portion is a column inserted in the positioning hole;
   wherein the jumper further includes at least one protrusion abutting against the end surface of the substrate to form a gap between the end surface of the substrate and the mounting portion, the optical fiber has an end portion extending into the gap, an optical material is disposed in the gap and binds the end portion of the optical fiber, and the end surface of the optical fiber faces the end surface of the substrate and is substantially aligned with an end surface of the protrusion.

2. The optical transmission device of claim 1, wherein the optical fiber is fixed to the mounting portion.

3. The optical transmission device of claim 2, wherein the mounting portion includes a slot that the optical fiber is disposed through, and a binder is disposed in the slot to bind the optical fiber.

4. The optical transmission device of claim 1, wherein an end surface of the optical transmission channel is located between the first positioning portion and the end surface of the optical fiber.

5. The optical transmission device of claim 1, wherein the mounting portion includes an abutting surface abutting against the end surface of the substrate, and a distance between the first positioning portion and the end surface of the substrate is equal to a distance between the second positioning portion and the abutting surface.

6. The optical transmission device of claim 1, wherein the substrate further includes a circuit layer, and the jumper further includes a transmission circuit electrically connected to the circuit layer.

7. The optical transmission device of claim 1, wherein the substrate further includes a recess with an end surface, and the jumper is engaged within the recess.

8. The optical transmission device of claim 1, wherein the substrate further includes a photoelectric conversion module with an integrated circuit package and an optical component connected thereto, the optical component corresponds to a reflective surface of the optical transmission channel and includes a photoelectric conversion element or a photoelectric emitting element.

9. The optical transmission device of claim 8, wherein the substrate further includes a refractor connected between the optical component and the reflective surface, and the refractive index of the refractor progressively increases or progressively decreases from the optical component towards the reflective surface.

10. The optical transmission device of claim 8, wherein the substrate further includes a light-guiding portion located between the optical component and the reflective surface, and the light-guiding portion has a core extending from the optical component toward the reflective surface, and a cladding coated over the core.

\* \* \* \* \*